United States Patent
Conner et al.

(10) Patent No.: US 7,355,550 B1
(45) Date of Patent: Apr. 8, 2008

(54) METHODS AND SYSTEMS FOR DISTINGUISHING ARINC 743 FROM ARINC 743A PROTOCOLS

(75) Inventors: Kevin J Conner, Kent, WA (US);
Steve C. Johnson, Issaquah, WA (US);
Yasuo Ishihara, Kirkland, WA (US)

(73) Assignee: Honeywell International, Inc., Morristown, NJ (US)

( * ) Notice: Subject to any disclaimer, the term of this patent is extended or adjusted under 35 U.S.C. 154(b) by 19 days.

(21) Appl. No.: 11/469,387

(22) Filed: Aug. 31, 2006

(51) Int. Cl.
*G01S 5/02* (2006.01)
(52) U.S. Cl. ............................. 342/357.06; 342/357.09
(58) Field of Classification Search ........... 342/357.02, 342/357.03, 357.06, 357.09; 701/207, 213, 701/215
See application file for complete search history.

(56) References Cited

U.S. PATENT DOCUMENTS

| | | | |
|---|---|---|---|
| 2003/0133435 A1* | 7/2003 | Friedrich | 370/349 |
| 2006/0238304 A1* | 10/2006 | Loving | 340/10.1 |
| 2007/0243830 A1* | 10/2007 | Isenmann et al. | 455/67.11 |
| 2007/0249386 A1* | 10/2007 | Bennett | 455/550.1 |

\* cited by examiner

*Primary Examiner*—Dao Phan
(74) *Attorney, Agent, or Firm*—Black Lowe & Graham PLLC

(57) ABSTRACT

An apparatus and method for automatically adjusting for data protocol discrepancies. The apparatus includes a unit that receives a signal from GPS receiver. The signal was formatted according to a transmission protocol. The unit includes a first component that estimates User Equivalent Range Error (UERE) based on the received signal and adjusting at least one value of the received signal based on the estimated UERE and one or more predefined scale factor and a second component that uses the adjusted at least one value.

14 Claims, 2 Drawing Sheets

METHODS AND SYSTEMS FOR DISTINGUISHING ARINC 743 FROM ARINC 743A PROTOCOLS

BACKGROUND OF THE INVENTION

Global Positioning Systems (GPS) units transmit GPS data using the Aeronautical Radio, Inc (ARINC) 743 or 743A protocols. These protocols are nearly identical except for the scaling of the Figure of Merit (FOM) terms. Currently, avionics system require the GPS installation (unit) to specify which type of ARINC protocol is used. However, if the GPS installation has been upgraded to use the ARINC 743A protocol, but the GPS installation is still reporting itself as using the ARINC 743 protocol, the outputted GPS data is improperly scaled. Improperly scaled FOM data can adversely affect avionic devices, such as an Enhanced Ground Proximity Warning System (EGPWS).

Therefore, there is a need to easily and cheaply determine the protocol type of GPS data.

BRIEF SUMMARY OF THE INVENTION

The present invention provides an apparatus and method for automatically adjusting for data protocol discrepancies. The apparatus includes a unit that receives a signal from GPS receiver. The signal is formatted according to a transmission protocol. The unit includes a first component that estimates User Equivalent Range Error (UERE) based on the received signal and adjusts at least one value of the received signal based on the estimated UERE and one or more predefined scale factor and a second component that uses the adjusted at least one value.

In one aspect of the invention, the at least one value includes a Horizontal Figure of Merit (HFOM) and Vertical Figure of Merit (VFOM).

In another aspect of the invention, the first component includes a component for computing the estimate of UERE using a HFOM value and a HDOP value and a component for filtering the estimated UERE. The first component also includes a component for determining if the filtered UERE estimate is greater than or less than a range of UERE, a component for multiplying at least one of HFOM or VFOM by one of two scale factors, if the filtered UERE estimate is determined less than the UERE range, and a component for dividing at least one of HFOM or VFOM by one of the two scale factors, if the filtered UERE estimate is determined greater than the UERE range.

In still another aspect of the invention, the transmission protocols include ARINC 743 and ARINC 743A. The two scale factors include an HFOM scale factor between 28 and 29 and a VFOM scale factor between 9 and 10 and wherein the range of UERE is 4 to 33.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
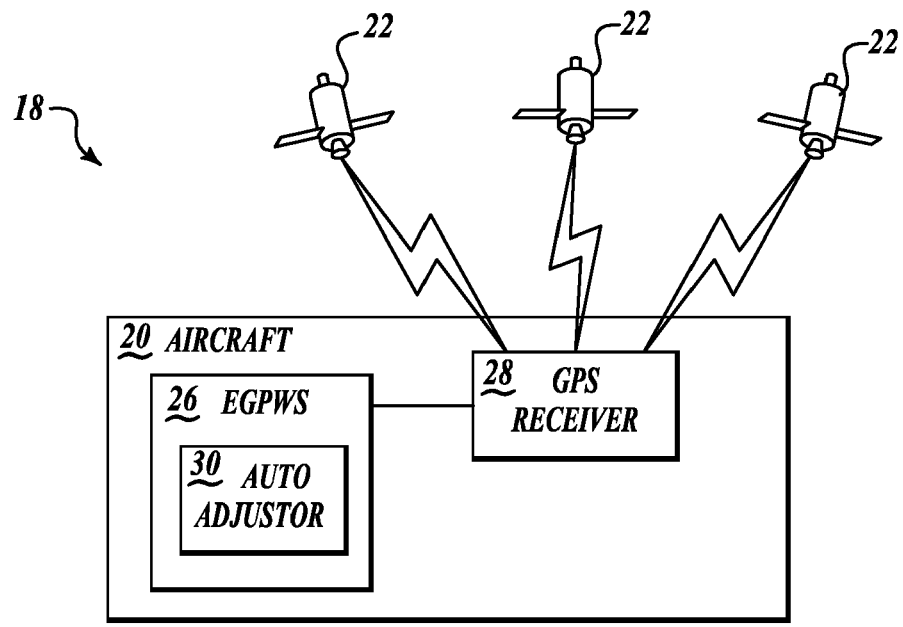
FIG. 1 illustrates a block diagram of an example environment and aircraft formed in accordance with an embodiment of the present invention.

FIG. 1 illustrates a block diagram of an example environment 18 formed in accordance with an embodiment of the present invention. The environment 18 includes a plurality of satellites 22 and an aircraft 20 having a Global Positioning System (GPS) receiver 28 and a Terrain Awareness Warning System, such as an Enhanced Ground Proximity Warning System (EGPWS) 26 or another system that uses GPS information received by the GPS receiver 28 from the plurality of satellites 22. In one embodiment, the EGPWS 26 includes an automatic adjustor 30.

The automatic adjustor 30 analyzes the data sent from the GPS receiver 28 and scales certain GPS data if it determines there is a discrepancy between the expected protocol from the GPS receiver 28 and the actual protocol used to transmit the data. More specifically, the auto adjustor 30 uses Figure of Merit (FOM) information and Dilution of Precision (DOP) data for the Horizontal channel to back compute User Equivalent Range Error (UERE). A normal UERE should fall within the range of approximately 4 to 33 meters. If the EGPWS 26 is configured to receive GPS data according to Aeronautical Radio, Inc (ARINC) 743 and the GPS receiver 28 is sending according to ARINC 743A protocol or vice a versa, the computed UERE is sufficiently outside a normal UERE range. The automatic adjustor 30 then automatically adjusts the FOMs to the correct value (i.e. equivalent to both systems using the same protocol).

Figure 2:
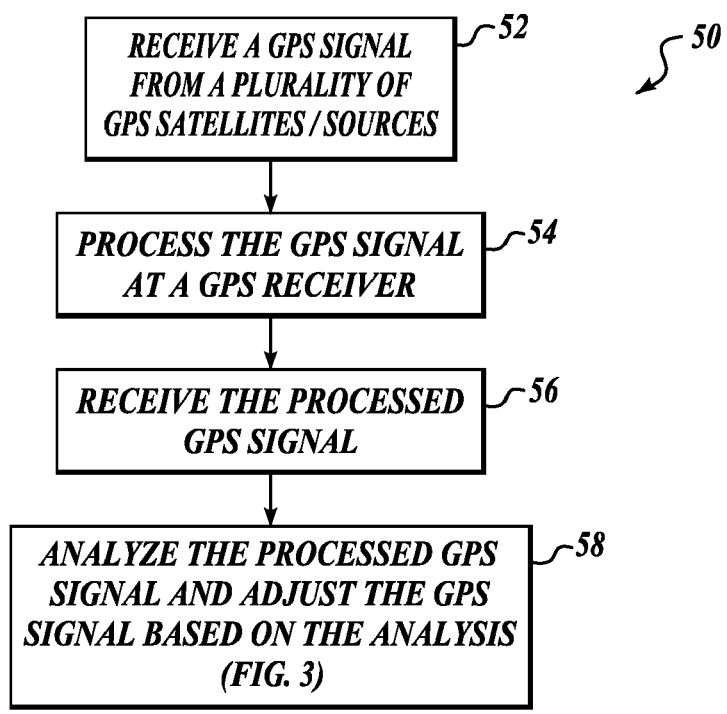
FIGS. 2 and 3 illustrate flow diagrams of an example process performed by the auto detector of FIG. 1 in accordance with an embodiment of the invention.
Figure 3:
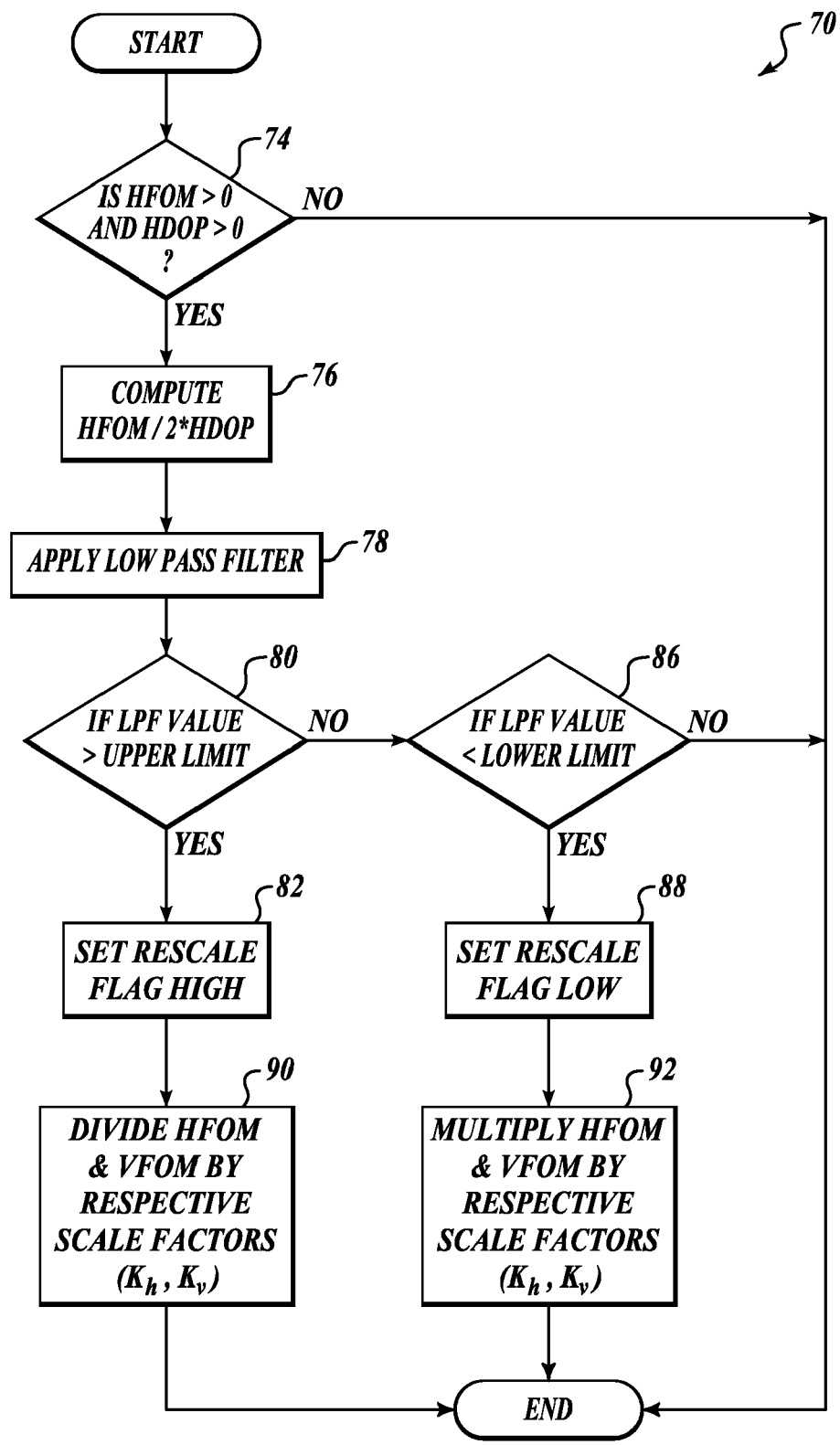

FIGS. 2 and 3 illustrate a flow diagram of an example process 50 performed by the automatic adjustor 30 of FIG. 1, in accordance with an embodiment of the invention. As shown in FIG. 2, the process 50 begins at a block 52 whereby the GPS receiver 28 receives GPS signals from one or more of the plurality of GPS satellites 22. At a block 54, the GPS receiver 28 processes the received GPS signals and formats the processed information according to either the ARINC 743 or 743A protocols. Next, at a block 56 the adjustor 30 receives the GPS signals from the GPS receiver 28. At a block 58, the auto adjustor 30 analyzes the sent data and adjusts the sent data if it was determined during analysis that a protocol discrepancy exists.

FIG. 3 shows a process 70 at block 58 from FIG. 2 for analyzing and adjusting, if necessary, GPS data received from the GPS receiver 28. First, at a decision block 74, the process 70 determines whether Horizontal FOM (HFOM) and Horizontal DOP (HDOP) values are greater than 0. The process 70 is complete if the results of the decision block 74 indicate that either the HFOM or HDOP values are equal to or less than 0. However, if both the HFOM and HDOP values are greater than 0, the process 70 continues to block 76 where an estimated UERE is computed. The UERE estimate is computed with Equation (1):

$$UERE = \frac{HFOM}{2(HDOP)} \tag{1}$$

At a block 78, the result of the computation performed at block 76 is sent through a low pass filter. The filtered UERE is used to compare to the normal limits.

The horizontal scale factor from 743 to 743A ($K_h$) is 16 nm/1024 meters or approximately 28.856. The vertical scale factor from 743 to 743A ($K_v$) is 32768 ft/1024 m or approximately 9.727. At a decision block 80, if the filtered UERE is greater than an upper limit (e.g. 115 meters (i.e. 4 m*K$_h$)), a Rescale flag is set to HIGH at a block 82 and the FOMs for vertical and horizontal are divided by their respective scale factor K (K$_h$, K$_v$) at block 90. In this situation, the FOMs are being transmitted via the ARINC 743 protocol, but the EGPWS 26 interprets the FOMs are being transmitted via the ARINC 743A protocol.

If the filtered UERE is less than the upper limit and at decision block 86 is less than a lower limit (e.g. 1.5 meters (i.e. 33 m/K$_h$)), the Rescale flag is set to LOW at block 88 and the vertical FOM (VFOM) and HFOM are multiplied by their respective scale factor K (K$_h$, K$_v$) at block 92. In this situation, the FOMs are being transmitted via the ARINC 743A protocol, but the EGPWS 26 interprets the FOMs are being transmitted via the ARINC 743 protocol. If the filtered UERE is within normal UERE limits, the Rescale flag is set to NORMAL and the FOMs remain unchanged—the protocol understood by the EGPWS 26 is the protocol that is being used to send the data from the GPS receiver 28. The resultant adjusted or unadjusted FOMs are used by the EGPWS 26 or other avionics.

The values used at the decision blocks 80 and 86 may vary depending upon desired results. Also, in one embodiment the low pass filter is pre-charged, which is a standard operation on filters. It involves setting the internal state to a specific value.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for automatically adjusting for data protocol discrepancies, the method comprising:
   receiving a signal at a GPS receiver;
   sending the received signal from the GPS receiver to a unit based on a transmission protocol;
   estimating User Equivalent Range Error (UERE) based on the received signal;
   adjusting at least one value of the received signal based on the estimated UERE and one or more predefined scale factors; and
   using the adjusted at least one value at the unit.

2. The method of claim 1, wherein the at least one value includes one of a Horizontal Figure of Merit (HFOM) and Vertical Figure of Merit (VFOM).

3. The method of claim 2, wherein estimating comprises:
   computing the estimate of UERE using the HFOM and a Horizontal Dilution of Precision (HDOP) value; and
   filtering the estimated UERE.

4. The method of claim 3, wherein adjusting includes:
   determining if the filtered UERE estimate is greater than or less than a predetermined UERE range value;
   multiplying at least one of the HFOM or VFOM by one of two scale factors based on transmission protocols, if the filtered UERE estimate is determined to be less than the predetermined UERE range value; and
   dividing at least one of the HFOM or VFOM by one of the two scale factors, if the filtered UERE estimate is determined to be greater than the predetermined UERE range value.

5. The method of claim 4, wherein the transmission protocols include ARINC 743 and ARINC 743A.

6. The method of claim 5, wherein the two scale factors include an HFOM scale factor between 28 and 29 and a VFOM scale factor between 9 and 10 and wherein range of the UERE is 4 to 33.

7. The method of claim 1, wherein the unit includes an Enhanced Ground Proximity Warning System that uses the adjusted at least one value to determine an aircraft's position.

8. An apparatus for automatically adjusting for data protocol discrepancies, the apparatus comprising:
   a unit for receiving a signal from a GPS receiver, wherein the signal is formatted according to a transmission protocol, the unit comprising:
   a first component for estimating User Equivalent Range Error (UERE) based on the received signal and adjusting at least one value of the received signal based on the estimated UERE and one or more predefined scale factors; and
   a second component for using the adjusted at least one value.

9. The apparatus of claim 8, wherein the at least one value includes a Horizontal Figure of Merit (HFOM) and Vertical Figure of Merit (VFOM).

10. The apparatus of claim 8, wherein the first component comprises:
    a component for computing the estimate of UERE using a Horizontal Figure of Merit (HFOM) value and a Horizontal Dilution of Precision (HDOP) value; and
    a component for filtering the estimated UERE.

11. The apparatus of claim 10, wherein the first component further comprises:
    a component for determining if the filtered UERE estimate is greater than or less than a predetermined UERE range value;
    a component for multiplying at least one of HFOM or VFOM by one of two scale factors, if the filtered UERE estimate is determined less than the predetermined UERE range value; and
    a component for dividing at least one of HFOM or VFOM by one of the two scale factors, if the filtered UERE estimate is determined greater than the predetermined UERE range value.

12. The apparatus of claim 11, wherein the transmission protocols include ARINC 743 and ARINC 743A.

13. The apparatus of claim 12, wherein the two scale factors include an HFOM scale factor between 28 and 29 and a VFOM scale factor between 9 and 10 and wherein range of the UERE is 4 to 33.

14. The apparatus of claim 8, wherein the second component includes an Enhanced Ground Proximity Warning System that determines an aircraft's position based on the adjusted at least one value.

* * * * *